US011858706B2

(12) United States Patent
Durham et al.

(10) Patent No.: US 11,858,706 B2
(45) **Date of Patent: *Jan. 2, 2024**

(54) CONNECTED ELASTICS

(71) Applicant: Durham Enterprises Corporation, Salt Lake City, UT (US)

(72) Inventors: Benjamin Durham, South Jordan, UT (US); Michael Brian Freeman, North Salt Lake, UT (US)

(73) Assignee: Durham Enterprises Corporation, Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/954,069

(22) Filed: Sep. 27, 2022

(65) Prior Publication Data

US 2023/0093277 A1 Mar. 23, 2023

Related U.S. Application Data

(63) Continuation of application No. 16/368,833, filed on Mar. 28, 2019, now Pat. No. 11,453,538.

(60) Provisional application No. 62/649,402, filed on Mar. 28, 2018.

(51) Int. Cl.

| | |
|---|---|
| ***B65D 69/00*** | (2006.01) |
| ***B26D 3/12*** | (2006.01) |
| ***B26D 3/00*** | (2006.01) |
| ***B26D 3/16*** | (2006.01) |

(52) U.S. Cl.

CPC ............. *B65D 69/00* (2013.01); *B26D 3/003* (2013.01); *B26D 3/12* (2013.01); *B26D 3/16* (2013.01)

(58) Field of Classification Search

CPC .......... B65D 69/00; B26D 3/003; B26D 3/12; B26D 3/16

USPC ........ 206/338, 343, 345, 346; 264/234, 159; 132/273, 278

See application file for complete search history.

(56) References Cited

U.S. PATENT DOCUMENTS

| | | | | | |
|---|---|---|---|---|---|
| 1,155,325 | A | | 9/1915 | Miller | |
| 1,886,842 | A | * | 11/1932 | Shaw | B29D 99/0082 53/399 |
| 1,949,465 | A | * | 3/1934 | Gammeter | B29D 7/01 206/805 |
| 2,012,058 | A | * | 8/1935 | Shaw | B65D 75/02 206/460 |
| 2,037,254 | A | * | 4/1936 | Miller | B41M 1/32 101/493 |
| 2,102,689 | A | * | 12/1937 | Fischer | B26D 3/168 101/493 |
| 2,189,966 | A | * | 2/1940 | Spanel | B29D 29/00 264/303 |
| 2,242,967 | A | * | 5/1941 | Carlile | B27F 7/38 206/820 |
| 2,802,513 | A | * | 8/1957 | Stoeckel | B29D 99/0082 156/154 |

(Continued)

*Primary Examiner* — Jacob K Ackun

(74) *Attorney, Agent, or Firm* — DENTONS Durham Jones Pinegar

(57) ABSTRACT

A strand of connected elastics is disclosed. The strand includes a series of elastic bands and a series of connecting portions that connect the series of elastic bands to each other. The connecting portions may have configurations that enable them to broken when separation and use of an elastic from an end of the strand is desired. Methods for manufacturing and using strands of connected elastics are also disclosed.

9 Claims, 3 Drawing Sheets

(56) References Cited

U.S. PATENT DOCUMENTS 2,862,612 A * 12/1958 Brown .................. B65D 73/02
206/338
2,982,434 A * 5/1961 Hidding ............. A61M 5/1417
215/398
3,186,333 A * 6/1965 Hoffman .............. B65B 13/022
100/9
3,348,669 A * 10/1967 Powers .................. F16B 15/08
411/443
3,572,396 A * 3/1971 Hoffman et al. ...... B26D 3/168
100/9
3,918,132 A * 11/1975 McGahee ............. B65D 67/02
206/338
3,924,738 A * 12/1975 Poupitch ............. B65D 71/504
206/428
4,539,237 A * 9/1985 Clayton ................ B65D 63/10
24/30.5 R
4,660,718 A * 4/1987 Kato ........................ G09F 3/14
24/711.1
6,217,500 B1 * 4/2001 Helseth ................ A47F 13/085
493/962
7,763,135 B1 * 7/2010 Maltas ..................... G09F 3/02
156/289
8,635,795 B2 * 1/2014 Ludlow .................... G09F 3/02
40/665
9,355,577 B1 * 5/2016 Coleman .................. G09F 3/02
2012/0159988 A1 * 6/2012 Baird ................... G09F 21/026
63/3
2012/0228798 A1 * 9/2012 Han ....................... C08J 7/0427
264/234
2014/0261527 A1 * 9/2014 Chen ....................... A45D 8/34
112/475.08
2015/0034513 A1 * 2/2015 Helseth ............. B65D 73/0014
206/338
2018/0334303 A1 * 11/2018 Milbrandt .......... B65D 73/0014
2018/0350275 A1 * 12/2018 Milbrandt ................ G09F 3/04

* cited by examiner

CONNECTED ELASTICS

CROSS-REFERENCE TO RELATED APPLICATION

This application is a continuation of U.S. patent application Ser. No. 16/368,833, filed Mar. 28, 2019 and titled CONNECTED ELASTICS ("the '833 Application"), which issued as U.S. Pat. No. 11,453,538 on Sep. 27, 2022, which claims benefit of priority to the Mar. 28, 2018 filing date of U.S. Provisional Patent Application No. 62/649,402, titled CONNECTED ELASTICS ("the '402 Provisional Application"), pursuant to 35 U.S.C. § 119(e). The entire disclosures of the '833 Application and the '402 Provisional Application are hereby incorporated herein.

TECHNICAL FIELD

This disclosure relates to elastic bands, which are also referred to more simply as "elastics" and also as "rubber bands." More specifically, this disclosure relates to elastic bands that are partially secured to one another in a tubular arrangement until one or more single elastic bands is needed. Methods for manufacturing and using such an arrangement of elastic bands are also disclosed.

RELATED ART

Plastic elastics are very helpful as they are a minimal solution for holding items in a desired orientation (e.g., for holding grouped items together, for holding rolled items in rolled configurations, etc.) and are very inexpensive. They are often packaged in such a way that large numbers of elastics can be grouped together.

Elastics are typically provided and obtained in boxes or bags where a number of individually cut elastics are contained as a bunch. Elastics oftentimes become tangled with one another when packaged in a conventional manner. Even more commonly, when a single elastic is pulled out of the package, it will pull other elastics, with which it has become entangled, along with it. The unwanted elastics must then be picked up and placed back into the package. In addition, elastics spill readily out of conventional packaging, which may cause them to be scattered all over a drawer or a countertop, causing a mess, and sometimes resulting in lost rubber bands.

SUMMARY

Embodiments of strands of connected elastics, which are also referred to as "elastic strands," are disclosed. In various embodiments, a strand of connected elastics according to this disclosure may comprise a series of elastic bands that are arranged to define an elongated tube. The elastic bands and, thus, the elongated tube may comprise an elastic thermoplastic material, such as a rubberized thermoplastic polyurethane (TPU). The elastic bands and, thus, the elongated tube may have diameters of about 10 mm to about 20 mm. In specific embodiments, an elongated tube and each elastic band thereof may have a diameter of about 10 mm, a diameter of about 15 mm, a diameter of about 20 mm, etc.

The elastic bands that define an elongated tube, or a strand of connected elastics, may be connected to one another along a connecting portion of the elongated tube. The connecting portion may be linearly oriented as a tangent to the surface of the elongated tube. Alternatively, the connecting portion may include connecting features that alternate from one side of the elongated tube to another or are otherwise rotationally offset around the elongated tube. As another alternative, the connecting portion may be helically oriented; i.e., it may wrap around the elongated tube (e.g., as a spiral etc.). Other configurations of connecting portions are also within the scope of this disclosure.

In a specific embodiment, the elastic bands may be cut from an elongated tube while remaining connected to one another as parts of a strand of connected elastics. For example, an adjacent pair of elastic bands may be defined and partially separated from one another by way of a circumferential cut that may extend substantially, but not completely, through a circumference of the elongated tube. In a specific embodiment, circumferential cuts may be oriented transverse and perpendicular to a longitudinal axis through the elongated tube to define the elastic bands that make up the elongated tube. The portion of the elongated tube through which the cuts do not extend defines the connecting portion of the elongated tube, along which adjacent elastic bands are attached.

In some embodiments, each cut may extend into and partially through the connecting portion of the elongated tube, creating a score line along which the elongated tube may be torn or otherwise disrupted to facilitate the separation of one elastic band from another, adjacent elastic band or from a remainder of the elongated tube. The depth the cut extends into the connecting portion, or the amount of the connecting portion that remains between an end of the cut and an outer surface of the elongated tube, may be tailored to enable the ready separation of one elastic band from an adjacent elastic band, while minimizing the likelihood that the elastic band will be broken when it is separated from the adjacent elastic band, and when the elastic band is used.

A strand of connected elastics according to this disclosure may be manufactured by extruding an elastic thermoplastic material into the shape of an elongated tube. A series of cuts may then be defined along a length of the elongated tube. Each cut may extend only partially through the elongated tube so as to leave adjacent elastic bands defined by the cut connected at a tangential location, or connecting portion, on the outer surface of the elongated tube. In some embodiments, the cut may extend into a connecting portion of the elongated tube to define a score line in the connecting portion. The depth of cut may be controlled in a manner that defines a series of elastic bands along the length of the elongated tube, while defining small connecting portions that are capable of enabling adjacent elastic bands to be separated (e.g., pulled apart, etc.) from one another without damaging the newly separated elastic bands.

By holding the elastic bands in a connected state, the elastic bands will not become entangled during storage, simplifying the process of selecting an elastic band and separating it from the other elastic bands with which it is stored.

A method for using a strand of connected elastics according to this disclosure includes obtaining a strand of connected elastics that includes a series of elastic bands that are connected along an elongated connecting portion of an elongated tube, with the elastic bands and the elongated connecting portion being defined by a series of circumferential cuts partially through the elongated tube. An elastic band located at an end of the elongated tube may be grasped (e.g., with one hand, etc.) while a remainder of the elongated tube is separately grasped (e.g., with the other hand, etc.). The elastic band located at the end of the elongated tube may then be pulled (e.g., gently, etc.) from the remainder of the elongated tube to disrupt material of the elongated connecting portion that connects the elastic band to the remainder of the elongated tube and to remove the elastic band from the remainder of the elongated tube.

The elastic band may then be wrapped several times around a portion of hair to keep the hair in place or to keep a hair style in place. This product can be used with styles including braids, ponytails, pig tails, etc. As the remaining elastic bands are still held together by the connecting portions of the strand of connected elastics, they may enable an individual to better maintain an organized drawer.

Other aspects of the disclosed subject matter, as well as features and advantages of various aspects of the disclosed subject matter, will become apparent to those of ordinary skill in the art though consideration of this disclosure, the accompanying drawings, and the appended claims.

DETAILED DESCRIPTION

Figure 1:
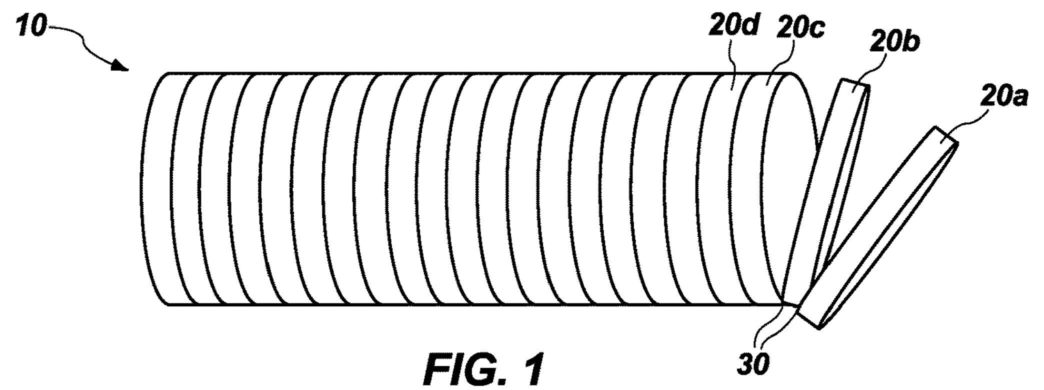
FIG. 1 is an orthogonal view of an embodiment of a strand of connected elastics according to this disclosure, with a linear connecting portion arranged along a length of the strand of connected elastics and parallel to a longitudinal axis through the strand of connected elastics.
Figure 2:
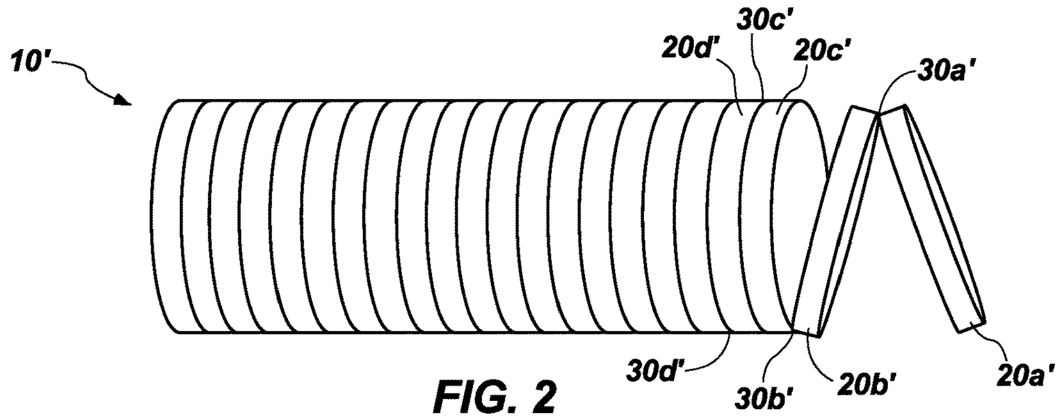
FIG. 2 is an orthogonal view of an embodiment of a strand of connected elastics with connecting portions between adjacent pairs of elastic bands being located at different rotational positions around the strand of connected elastics.
Figure 3:
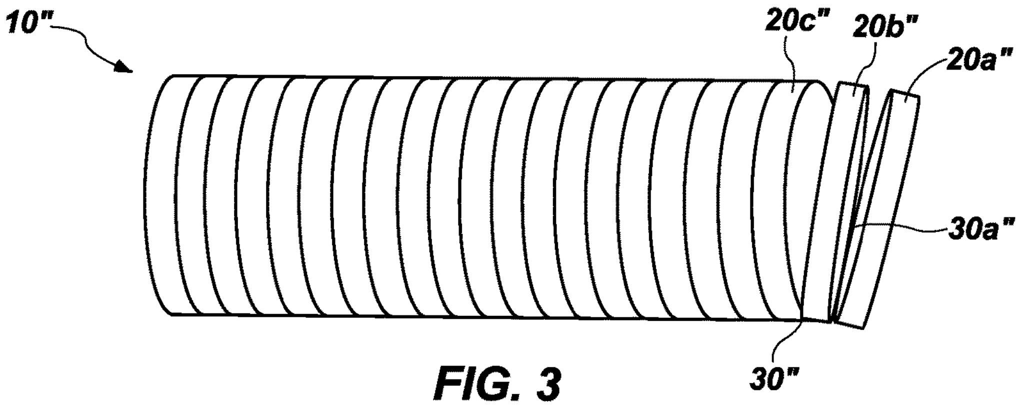
FIG. 3 is an orthogonal view of another embodiment of a strand of connected elastics with a connecting portion that is oriented helically around an outer surface of the strand of connected elastics.

FIGS. 1-3 illustrate various embodiments of strands 10, 10', 10" of connected elastic bands 20, 20', 20". The elastic bands 20, 20', 20" of each strand 10, 10', 10" and, thus, the strands 10, 10', 10" themselves may be made from an elastic polymer, or a so-called "elastomer." As an example, a thermoplastic polyurethane may be used to define a strand 10, 10', 10" of elastic bands 20, 20', 20" that are connected to each other. Among a variety of other suitable materials, natural rubber may also be used to define a strand 10, 10', 10" of elastic bands 20, 20', 20" that are connected to one another.

The embodiments of strands 10, 10', 10" that are depicted by FIGS. 1-3 have elongated cylindrical configurations. Strands 10, 10', 10" that have tubular configurations with other (i.e., non-circular) cross-sectional shapes are also within the scope of this disclosure.

Figure 1A:
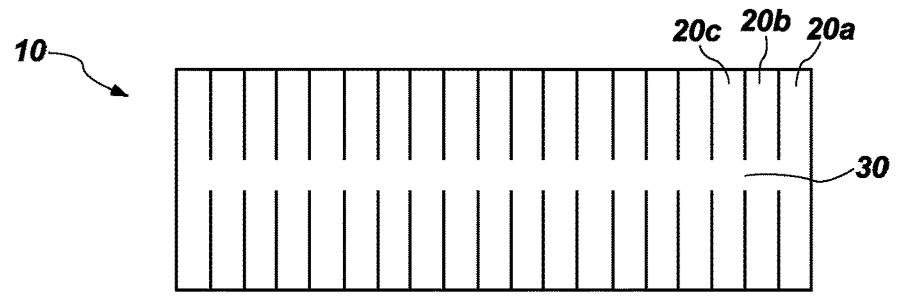
FIG. 1A is a bottom view of the embodiment of strand of connected elastics shown in FIG. 1, illustrating the connection portion of the strand of connected elastics.

FIGS. 1 and 1A illustrate an embodiment of a strand 10 of elastic bands 20*a*, 20*b*, 20*c*, etc. (each of which may also be referred to as an "elastic band 20" for the sake of simplicity), that are connected to one another. Adjacent elastic bands 20*a* and 20*b*, 20*b* and 20*c*, etc., of the strand 10 are connected to one another along a connecting portion 30 of the strand 10. The connecting portion 30 of the strand 10 has a linear configuration, is positioned tangentially relative to a body of the strand 10, and extends along a length of the strand 10, parallel to a longitudinal axis of the strand 10.

Figure 2A:
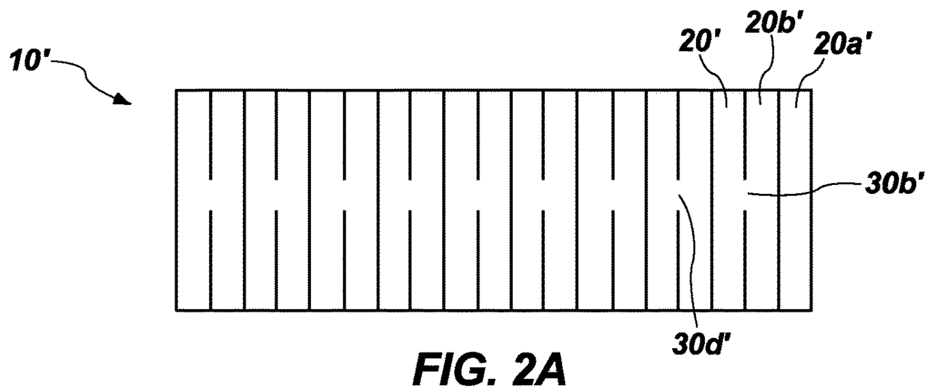
FIG. 2A is a bottom view of the embodiment of strand of connected elastics shown in FIG. 2, showing the connection portion of the strand of connected elastics.

FIGS. 2 and 2A depict another embodiment of a strand 10'. The connecting portions 30*a'*, 30*b'*, etc. (each of which may also be referred to herein as a "connecting portion 30'" for the sake of simplicity), between each pair of adjacent elastic bands 20*a'* and 20*b'*, 20*b'* and 20*c'*, etc. (each of which may also be referred to herein as an "elastic band 20'" for the sake of simplicity), respectively, of the strand 10' are not arranged linearly. Instead, the positions of the connecting portions 30' around the circumference or periphery of the strand 10' vary in sequence between each adjacent pair of elastic bands 20'. As an example, the locations of sequentially adjacent (along the length of the strand 10') connecting portions 30' (e.g., 30*a'* and 30*b'*, 30*b'* and 30*c'*, etc.) may alternate from one side of the strand 10' to another (e.g., at a 180° rotation from one pair of elastic bands 20' to the next pair of elastic bands 20'), as shown in FIGS. 2 and 2A, imparting the strand 10' with an accordion-like configuration. In another example, the positions of sequentially adjacent connecting portions 30' around the strand 10' may be rotationally offset by about 120° from one connecting portion 30' to the next. In another example, the positions of sequentially adjacent connecting portions 30' around the strand 10' may be rotationally offset by about 90° from one connecting portion 30' to the next.

Figure 3A:
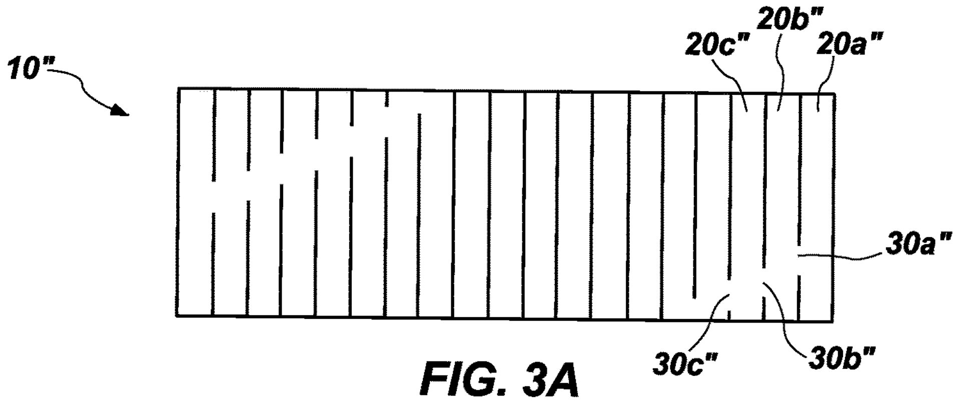
FIG. 3A is a bottom view of the embodiment of strand of connected elastics shown in FIG. 3, depicting the connection portion of the strand of connected elastics.

FIGS. 3 and 3A show an embodiment of strand 10" with connecting portions 30*a"*, 30*b"*, 30*c"*, etc., that are arranged helically around the strand 10". Thus, the rotational offsets between sequentially adjacent connecting portions 30*a"* and 30*b"*, 30*b"* and 30*c"*, etc., are less than 90° (e.g., about 45° or less, about 30° or less, about 20° or less, about 15° or less, about 10° or less, about 5° or less, etc.). Like strands 10 (FIGS. 1 and 1A) and 10' (FIGS. 2 and 2A), strand 10" includes a series of elastic bands 20*a"*, 20*b"*, 20*c"*, etc., that may be pulled apart from one another.

Figure 4:
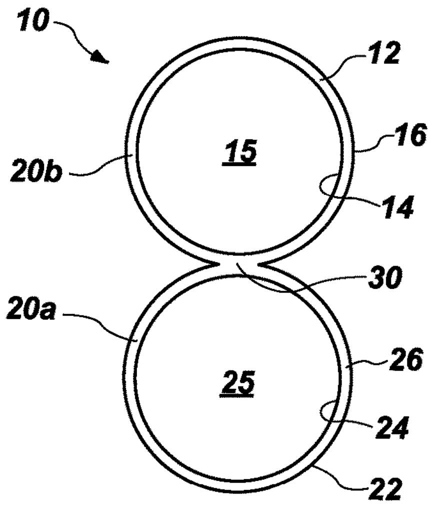
FIG. 4 illustrates a strand of connected elastics with a connecting portion that lacks a cut or a score line.
Figure 5:
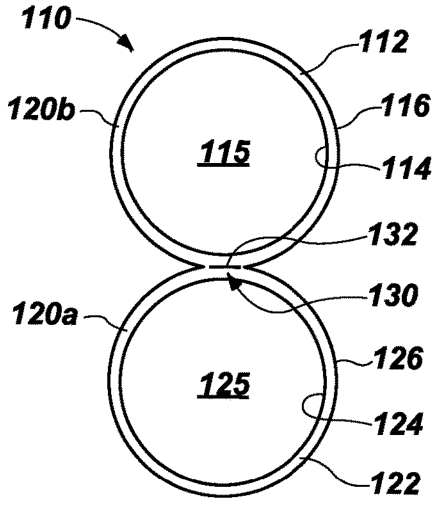
FIG. 5 illustrates a strand of connected elastics with a connecting portion that extends into an interior surface of a wall of the strand of connected elastics.

Turning now to FIGS. 4 and 5, the relationship between the elastic bands 20, 120 of a strand 10, 110 is described in further detail. Each of FIGS. 4 and 5 shows a strand 10, 110 of connected elastic bands 20, 120, with an elastic band 20, 120 at an end of thereof being pulled down, away from a remainder of the strand 10, 110.

Each strand 10, 110 includes a body 12, 112 with an inner surface 14, 114 and an outer surface 16, 116. The inner surface 14, 114 of the body 12, 112 defines a lumen 15, 115 that extends through a length of the strand 10, 110.

Each elastic band 20, 120 includes a body 22, 122 with an inner surface 24, 124 and an outer surface 26, 126. The inner surface 24, 124 of the body 22, 122 defines an opening 25, 125 of the elastic band 20, 120.

Each elastic band 20, 120 is connected to a remainder of its strand 10, 110 by way of a connecting portion 30, 130. Each connecting portion 30, 130 may comprise a material from which the body 12, 112 of the strand 10, 110 and the body 22, 122 of the elastic band 20, 120 are defined (e.g., the same material as the body 12, 112 of the strand 10, 110 and as the body 22, 122 of the elastic band 20, 120). As illustrated by FIG. 4, one or more connecting portions 30 of a strand 10 may have a thickness that is the same as the thicknesses of the body 12 of the strand 10 and the body 22 of the elastic band 20. As depicted by FIG. 5, a strand 110 may include one or more connecting portions 130 with a score line 132 or other features (e.g., perforations, etc.) that render such connecting portions 130 thinner or otherwise weaker than the bodies 22 and 122 of the strands 10 and 110, respectively.

Figure 6:
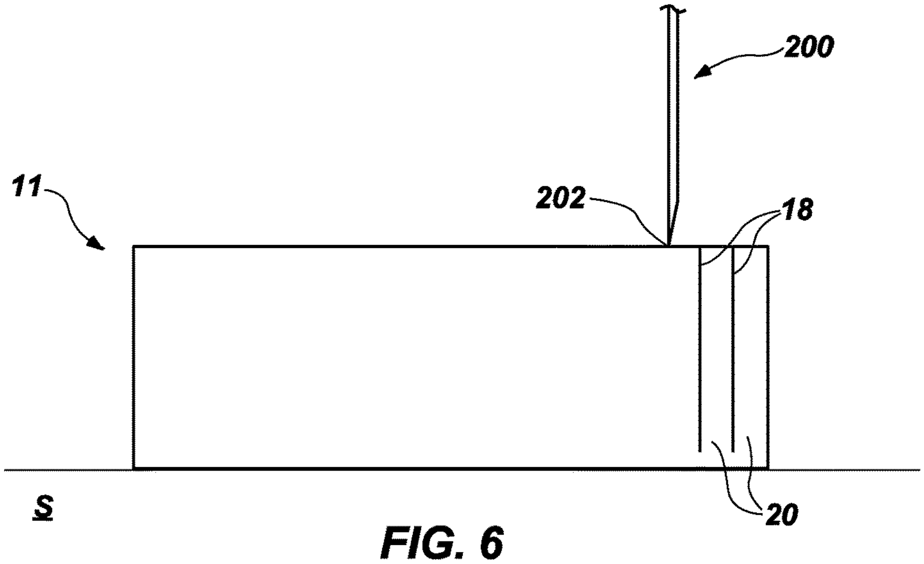
FIGS. 6 and 7 provides a representation of a method for manufacturing a strand of connected elastics.
Figure 7:
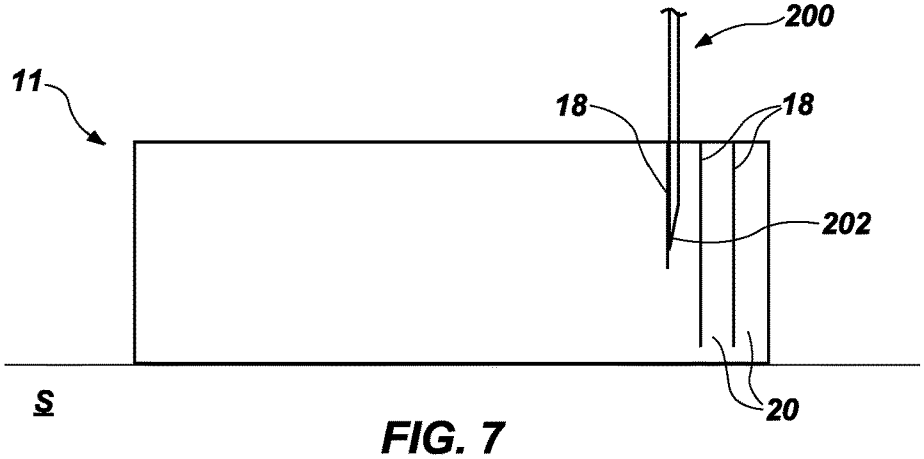

FIGS. 6 and 7 provide a graphical representation of a manner in which a strand 10 (FIGS. 1 and 1A) of connected elastic bands 20 may be defined. A suitable elastomer may be extruded in a manner known in the art to define a tube 11 with a desired shape and dimensions. The tube 11 may then be supported (e.g., upon a surface S, as depicted in FIGS. 6 and 7) and cut lines 18 may be defined substantially, but not completely, therethrough. The cut lines 18 may be defined at a series of locations along a length of the tube 11. As illustrated, a blade 200 may impact the tube 11, optionally smashing it down and defining a cut line 18 through the tube 11. The travel of the blade 200 may be limited, enabling an edge 202 of the blade 200 to stop short of a surface S by which the tube 11 is supported and, thus, leave the newly defined elastic band 20 connected to a reminder of the tube 11 by way of a connecting portion 30, 130 (FIGS. 4 and 5, respectively). More specifically, the travel of the blade 200 may enable the edge 202 of the blade 200 to cut into the material of to define the connecting portion 130, imparting the connecting portion 130 with a weakening feature (e.g., a score line 132, perforations, etc.) along which the tube 11 may be torn or otherwise disrupted to facilitate the separation of one elastic band 20 from another, adjacent elastic band 20 or from a remainder of the tube 11. The location of the tube 11 may then be incrementally advanced relative to the blade 200 or the location of the blade 200 may be incrementally advanced along the length of the tube 11, and the process may be repeated. Alternatively, a series of blades 200 may simultaneously define a corresponding series of cut lines in a tube 11.

As an alternative to a strand 10 (FIGS. 1 and 1A), 10' (FIGS. 2 and 2A), 10" (FIGS. 3 and 3A), etc., that consists essentially of (e.g., with the exception of decorative features (e.g., glitter, colored particles, fluorescent particles, phosphorescent particles, etc.), fragrance, etc.) or consists of an elastomeric material, other embodiments of a strand of connected elastics according to this disclosure may include a series of elastic bands that are completely distinct from one another (e.g., have been completely severed, etc.), but are secured together in a series by one or more separate connecting features. As an example, a series of elastic bands could be secured (e.g., adhered, etc.) to a connecting feature that comprises a strip of polymer (e.g., an adhesive tape, etc.) that resides on a surface (e.g., an outer surface, an inner surface, etc.) of the strand. In embodiments where such a connecting feature resides on an outer surface of the strand, the strand may be defined by providing a tube 11 (FIGS. 6 and 7), adhering the connecting feature to an outer surface of the tube 11, and cutting the tube 11 with a blade 200 (FIGS. 6 and 7) or similar apparatus to define cut lines 18 (FIGS. 6 and 7) completely through the tube 11, but not completely through the connecting feature.

As another option, a connecting feature comprising an elongated strip of a suitable material (e.g., a cured adhesive, a hot melt adhesive, etc.) may be applied to an assembly of previously separated elastic bands. As yet another option, connecting features may be applied to a series of pre-separated elastic bands as discrete elements (e.g., circular drops, etc.) to one or more adjacent locations of adjacent elastic bands to secure them to each other.

Figure 8:
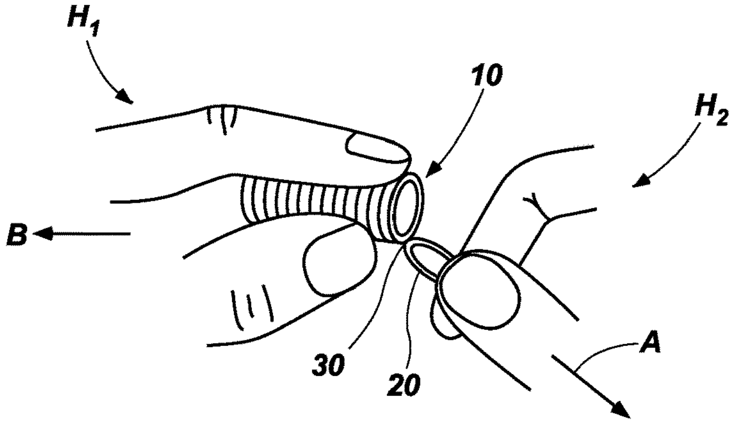
FIG. 8 illustrates a method for separating an elastic band from a strand of connected elastics.

Turning now to FIG. 8, an embodiment of use of a strand 10 of connected elastic bands 20 is depicted. Specifically, FIG. 8 depicts separation of an elastic band 20 from a strand 10 of which the elastic band 20 is a part. As an example, an individual may hold the strand 10 with one hand $H_1$ (e.g., between his or her thumb and index finger of that hand $H_1$, etc.) and grasp an elastic band 20 at an end of the strand 10 with the other hand $H_2$ (e.g., between his or her thumb and index finger of the other hand $H_2$, etc.). The individual may then pull the elastic band 20 away from the remainder of the strand 10 (e.g., with his or her hand $H_2$) in the direction of arrow A, pull the strand 10 away from the elastic band 20 (e.g., with his or her hand $H_1$) in the direction of arrow B, or pull the elastic band 20 and the remainder of the strand 10 apart from one another in the directions of arrows B and A, respectively, to separate the elastic band 20 from the remainder of the strand 10. The individual may then use the elastic band 20 in any suitable manner (e.g., for styling hair, for holding gathered items together, for holding an item in a rolled configuration, etc.).

The preceding specification provides a description of some specific embodiments of the disclosed subject matter. It should not be considered in such a way as to limit the scope of any of the claims that follow. Each claim should be construed in a manner consistent with its plain language, and encompass all equivalents to each of its elements.

What is claimed:

1. A series of connected elastic bands, comprising:
an elongated tube, including:
a single connecting portion defined by a material of the elongated tube extending over a surface of the elongated tube; and
a series of circumferential cuts along a length of the elongated tube, each circumferential cut of the series of circumferential cuts extending through the elongated tube to the single connecting portion and partially through a thickness of the single connecting portion to define and separate adjacent elastic bands of a series of connected elastic bands from each other, with only the single connecting portion connecting the adjacent elastic bands to each other.

2. The series of connected elastic bands of claim 1, wherein the single connecting portion comprises a tangent to the surface of the elongated tube.

3. The series of connected elastic bands of claim 1, wherein the single connecting portion comprises a spiral extending around a circumference of the elongated tube.

4. The series of connected elastic bands of claim 1, wherein a remaining thickness of the single connecting portion coincident with each cut of the series of circumferential cuts enables separation of an elastic band of the series of connected elastic bands from an adjacent elastic band of the series of connected elastic bands without breaking the elastic band or the adjacent elastic band.

5. A method for using an elastic band, comprising:
obtaining a series of elastic bands that are connected only along a single connecting portion of an elongated tube, with the elastic bands being defined by a series of circumferential cuts extending through the elongated tube and into a thickness of the single connecting portion, but not completely through the thickness of the single connecting portion, the single connecting portion comprising a material of a portion of a wall of the elongated tube;

grasping an elastic band of the elongated tube;

separately grasping a portion of the elongated tube adjacent to the elastic band; and pulling the elastic band from the portion of the elongated tube to disrupt material of the single connecting portion that connects the elastic band to the portion of the elongated tube and to remove the elastic band from the portion of the elongated tube.

6. The method of claim 5, wherein pulling the elastic band comprises disrupting material along a cut line extending into a thickness of a wall of the elongated tube defining the single connecting portion.

7. The method of claim 5, further comprising:

after pulling the elastic band, storing the portion of the elongated tube as a unitary element.

8. A series of connected elastic bands, comprising;

an elongated tube, including:

a connecting portion extending over a surface of the elongated tube, adjacent elastic bands of the series of connected elastic bands being connected to each other along the connecting portion; and a series of circumferential cuts along a length of the elongated tube, each circumferential cut of the series of circumferential cuts extending through the elongated tube to and partially through at least part of the connecting portion to define each elastic band of the series of connected elastic bands.

9. The series of connected elastic bands of claim 8, wherein a remaining thickness of the connecting portion coincident with each cut of the series of circumferential cuts enables separation of an elastic band of the series of connected elastic bands from an adjacent elastic band of the series of connected elastic bands without breaking the elastic band or the adjacent elastic band.

* * * * *